(12) United States Patent
Kuure et al.

(10) Patent No.: US 7,751,358 B2
(45) Date of Patent: Jul. 6, 2010

(54) TRANSMITTING DATA TO A GROUP OF RECEIVING DEVICES

(75) Inventors: Pekka Kuure, Espoo (FI); Markku Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 274 days.

(21) Appl. No.: 10/965,258

(22) Filed: Oct. 15, 2004

(65) Prior Publication Data

US 2006/0034202 A1 Feb. 16, 2006

(30) Foreign Application Priority Data

Aug. 12, 2004 (FI) .................................. 20041075

(51) Int. Cl.
*H04H 20/71* (2008.01)
*H04L 12/66* (2006.01)

(52) U.S. Cl. .................. 370/312; 370/353; 455/517

(58) Field of Classification Search ................. 370/312, 370/353; 455/517–519
See application file for complete search history.

(56) References Cited

U.S. PATENT DOCUMENTS

| | | |
|---|---|---|
| 2002/0181415 A1 | 12/2002 | West et al. |
| 2003/0153342 A1 | 8/2003 | Crockett et al. |
| 2004/0055017 A1 | 3/2004 | Delpuch et al. |
| 2004/0087319 A1* | 5/2004 | Bos et al. ..................... 455/458 |
| 2005/0105511 A1* | 5/2005 | Poikselka .................... 370/352 |
| 2005/0124365 A1* | 6/2005 | Balasuriya et al. .......... 455/518 |
| 2005/0135348 A1 | 6/2005 | Staack |
| 2005/0259803 A1* | 11/2005 | Khartabil ............... 379/202.01 |

FOREIGN PATENT DOCUMENTS

| | | |
|---|---|---|
| EP | 0 969 687 A1 | 1/2000 |
| WO | WO 00/21075 A1 | 4/2000 |
| WO | WO 00/79826 A1 | 12/2000 |
| WO | 03096149 A2 | 11/2003 |
| WO | 2004042963 A1 | 5/2004 |

OTHER PUBLICATIONS

3GPP TS 22.146 V6.5.0 (Jun. 2004), "*3rd Generation Partnership Project; Technical Specification Group Services and System Aspects; Multimedia Broadcast/Multicast Service; Stage 1 (Release 6)*", pp. 1-17.
3GPP TS 23.246 V.6.3.0 (Jun. 2004), "*3rd Generation Partnership Project; Technical Specification Group Services and . System Aspects; Multimedia Broadcast/Multicast Service (MBMS); Architecture and functional description (Release 6)*", pp. 1-41.
Request for Comment 3261, "*SIP: Session Initiation Protocol*" Jun. 2002, pp. 1-74.
Office Action for corresponding European Patent Application No. EP05771108, dated Jul. 17, 2009, pp. 1-6.

* cited by examiner

*Primary Examiner*—Quochien B Vuong
(74) *Attorney, Agent, or Firm*—Ditthavong Mori & Steiner, P.C.

(57) ABSTRACT

A data transmission method transmits data to a group of receiving communication devices in a communication system comprising at least one cellular network. The method includes defining, by an application server situated beyond a cellular network, a group of receiving communication devices in the cellular network, the application server having no visibility to locations of receiving devices in the cellular network. The method also includes receiving, in a broadcast/multicast network entity configured to provide broadcast and multicast services in the cellular network, data to be transmitted from the application server to the group. The method also includes transmitting the data from the broadcast/multicast network entity to the group using broadcast and/or multicast transmission. Furthermore, a network entity in a cellular network and a communication system are provided configured to implement the method.

24 Claims, 2 Drawing Sheets

TRANSMITTING DATA TO A GROUP OF RECEIVING DEVICES

FIELD OF THE INVENTION

The invention relates to communication systems, and more particularly to transmitting data to a group of receiving communication devices in a cellular network of a communication system.

BACKGROUND OF THE INVENTION

A communication system can be seen as a facility that enables communication sessions between two or more entities such as a communication device and/or other nodes associated with the communication system. Subscribers, such as the users or end-users, to a communication system may be offered and provided numerous services, such as two-way or multi-way calls, data communication or multimedia services or simply an access to a network, such as the Internet. The services may be offered by an operator of a network of the communication system or by an external service provider.

Examples of communication systems may include fixed line communication systems, such as a public switched telephone network (PSTN), wireless communication systems, such as a public land mobile network (PLMN), e.g. global system for mobile communications (GSM), general packet radio service (GPRS), universal mobile telecommunications system (UMTS), other wireless networks, such as a wireless local area network (WLAN), and so on, and/or other communication networks, such as an Internet Protocol (IP) network and/or other packet switched data networks. Various communication systems may simultaneously be concerned in a connection.

Any appropriate communication device may be used for accessing a communication system. Examples of communication devices may comprise, but are not limited to, wireless devices, e.g. user equipment (UE), a mobile station (MS), a cellular phone, a personal digital assistant (PDA) or the like, or other terminals, such as a personal computer (PC), or any other equipment operable according to a suitable network protocol, such as a wireless applications protocol (WAP) or a hypertext transfer protocol (HTTP). The communication device may support, in addition to call and network access functions, other services, such as short message service (SMS), multimedia message service (MMS), electronic mail (email), Web service interface (WSI) messaging and voice mail.

A user of a wireless communication device may access a communication network via a radio access network (RAN), which is typically controlled by an appropriate controller network element, such as radio network controller (RNC). Examples of radio access networks may comprise the UMTS terrestrial radio access network (UTRAN) and the GSM/EDGE radio access network (GERAN).

Application servers operating beyond the Gi interface may provide data transfer services to an individual as point-to-point or one-to-one services or group(s) of individuals as point-to-multipoint or one-to-many services. Such groups may be large in number of individuals comprised in the group. In the GPRS, the Gi may be defined as the interface between a gateway GPRS support node (GGSN) and an external public data network (PDN), such as the Internet. Thus, the application server operates beyond cellular networks and has no visibility to cellular specific addressing. An application server may use Uniform Resource Identifiers (URIs) and IP addresses to address members of a group. When distributing a data stream to a group, an application server may multiply the incoming data stream to obtain copies of the data stream for each member of the group. The application server may then send the copies of the data stream via the Gi interface to a cellular network and leave a responsibility of the data transfer thereafter to the cellular network.

The solution described above may work well when groups are relatively small or physically scattered. However, as a size of the group becomes greater or when a lot of members are located in a small geographical area, problems may arise. It is then more likely that too many members are located in close proximity with each other and might have to be served by a single transceiver network element using the same physical radio resources for many members of the group. A particular cell may be congested and data may not be delivered to all members. In addition to congestion problem in some particular cells, also other problems may be faced as many identical data streams are conveyed to many recipients within a single cellular network.

The way of transferring group data described above may not be efficient from a system resource point of view. In particular, with a great number of participants it may also appear to be impossible.

A direct one-to-one and one-to-many voice communication system named as Push to talk over Cellular (PoC) has been developed. The PoC service is based on half-duplex Voice over IP (VoIP) technology in cellular networks, e.g. the GSM/GPRS network. The PoC uses an "always-on" connection, which allows a subscriber to have a direct access to the service after the subscription to the service without additional measures, such as dial-up. The PoC enables a subscriber to listen to group traffic. Call can be started to both individuals and groups with a simple action, such as a push of a key. The call connection is established automatically and the receiver does not need to answer the call. In the network, a controlling server takes care of session management and floor control, such as multiplying the speech (i.e. the VoIP) for all members of a group.

Furthermore, a cellular system may include a multimedia broadcast/multicast service (MBMS) server, which is able to broadcast or multicast information to multiple participants over a geographical area. An MBMS server is not able to form groups, but provides information of different multicasting groups to participants. It is a responsibility of the participants to subscribe and join to a multicast service in order to receive the data. A reference architecture to support MBMS is defined by the Third Generation Partnership Project (3GPP) in TS 23.246 V.6.3.0 (2004-06) "Technical Specification Group services and System Aspects; Multimedia Broadcast/Multicast Service (MBMS); architecture and functional description (Release 6)", FIG. 1.

It might be desired to distribute data to a number of participants within an environment that comprises both application servers and broadcast/multicast service servers, such as MBMS servers, within a cellular network system. However, linking the application servers situated beyond the cellular network and the MBMS servers situated in the cellular network may be difficult.

It shall be appreciated that these issues are not limited to any particular communication environment, but may occur in any appropriate communication system.

SUMMARY OF THE INVENTION

Embodiments of the invention aim to address one or several of the above problems or issues.

In accordance with an aspect of the invention, there is provided a method for transmitting data to a group of receiving communication devices in a communication system comprising at least one cellular network. The method comprises defining, by an application server situated beyond a cellular network, a group of receiving communication devices in the cellular network, the application server having no visibility to locations of receiving devices in the cellular network. The method further comprises receiving, in a broadcast/multicast network entity configured to provide broadcast and multicast services in the cellular network, data to be transmitted from the application server to the group. The method further comprises transmitting the data from the broadcast/multicast network entity to the group using broadcast and/or multicast transmission.

In accordance with another aspect of the invention, there is provided a broadcast/multicast network entity in a cellular network. The network entity is configured to receive data to be transmitted from an application server situated beyond the cellular network and having no visibility to locations of receiving devices in the cellular network. The network entity is also configured to transmit the data to a group of communication devices in the cellular network using broadcast and/or multicast transmission, the group being defined by the application server.

In accordance with another aspect of the invention, there is provided a communication system. The communication system comprises an application server situated beyond a cellular network and having no visibility to locations of receiving devices in the cellular network, the application server configured to define a group of receiving devices in the cellular network. The communication system further comprises a broadcast/multicast network entity in the cellular network, the broadcast/multicast network entity configured to receive data to be transmitted from the application server and to transmit the data to communication devices in the cellular network using broadcast and/or multicast transmission.

Various other aspects and embodiments shall be described in the following detailed description and in the attached claims.

BRIEF DESCRIPTION OF THE DRAWINGS

The invention will now be described in further detail, by way of example only, with reference to the following examples and accompanying drawings, in which.

DETAILED DESCRIPTION OF PREFERRED EMBODIMENTS

Figure 1:
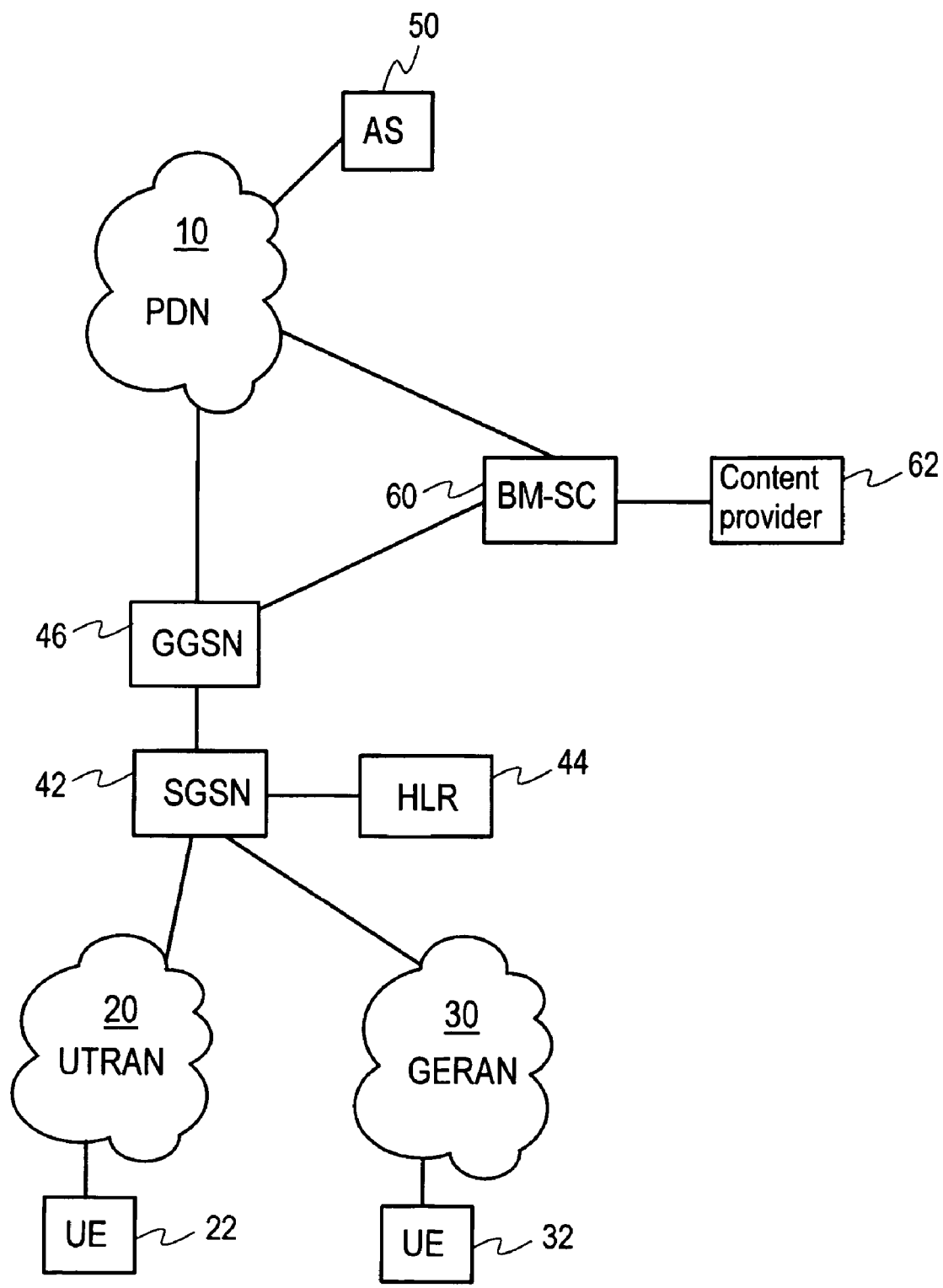
FIG. 1 shows an example of an arrangement in which the embodiments of the invention may be implemented.

Reference is made to FIG. 1 showing an example of a network architecture in which the embodiments of the invention may be implemented. In FIG. 1, a public data network (PDN) 10 is provided for offering data services. An example of the PDN 10 may comprise, but is not limited to, the Internet Protocol (IP) Multimedia Subsystem (IMS). The IMS uses the Session Initiation Protocol (SIP), which is an application layer control protocol defined by the Internet Engineering Task Force (IETF) for creating, modifying and terminating sessions with one or more participants. The SIP is defined in the document RFC 3261 "SIP: Session Initiation Protocol". The embodiments are mainly described referring to the IMS, but the same idea may be implemented with other communication systems as well.

In a SIP-controlled network, Uniform Resource Identifiers (URIs) are used to identify different types of actors in the network. Typically a URI points to a registered user identity of an individual user. A URI may identify also services, such as voicemail server or conference factory URI, conferencing instances, such as chat rooms or voice-over-IP (VoIP) conferencing instances, or other types of resources. In addition, a URI may point to a resource list, which may be a list of individual URIs, or in other words, a group of URIs. A URI pointing to a resource list shall be called in this specification also a group URI. Resource lists may be used in many applications, such as for one-to-many messaging, and so on. For example, a server in a network may maintain resource lists of e.g. one operator. A request addressed to such a resource list may be routed to the server, which may forward the request to individual contacts behind the resource list.

Data services, such as IMS services, can be provided with mobile communication devices via a mobile communication system. A mobile communication system is typically arranged to serve a plurality of mobile communication devices usually via a wireless interface between the communication device and at least one transceiver network element of the communication system, such as a base transceiver station (BTS) or a Node B. The mobile communication system may logically be divided between a radio access network (RAN) and a core network (CN).

In the arrangement of FIG. 1, a communication device 22 is arranged to access the core network via the UTRAN 20 as an access network. The communication device 22 is arranged to transmit signals to and receive signals from a transceiver network element (not shown) via a wireless interface between the communication device and the transceiver network element of the radio access network. Correspondingly, the transceiver network element is able to transmit signals to and receive signals from the communication device via the wireless interface. In the arrangement of FIG. 1, the communication device 32 is shown to access the core network via the access network GERAN 30.

It shall be appreciated that, although for clarity reasons FIG. 1 shows only two exemplifying radio access networks, a typical communication network system usually includes a number of radio access networks. It shall also be appreciated that although only two communication devices are shown in FIG. 1 for clarity, a number of user equipment and/or other communication devices may be in simultaneous communication with transceiver network elements of a communication system.

An access network, such as a radio access network (RAN), is typically controlled by appropriate controlling network elements, such as a radio network controller (RNC). These controllers are not shown in FIG. 1 in order to enhance clarity. A controller may be assigned for each transceiver network element or a controller can control a plurality of transceiver network elements, for example in the radio access network level. It shall be appreciated that the name, location and number of the network controllers depend on the system.

The core network (CN) entities typically include various switching and other control entities and gateways for enabling the communication via a number of radio access networks and also for interfacing a single communication system with one or more communication systems, such as with other cellular systems and/or fixed line communication systems. In the 3GPP systems, the radio access network controller is typically connected to an appropriate core network entity or entities such as, but not limited to, a serving general packet radio service support node (SGSN) 42. The radio access network controller is in communication with the SGSN via an appropriate interface, for example on an Iu or Gb interface. The SGSN may communicate with a subscriber information database, such as a home location register (HLR) 44. The SGSN 42 also typically communicates with a gateway GPRS support node (GGSN) 46. This interface may be, for example, a Gn/Gp interface.

In a 3GPP network, a packet data session is established to carry traffic flows over the network. Such a packet data session is often referred to as a packet data protocol (PDP) context. A PDP context may include a radio bearer provided between the communication device and the radio network controller, a radio access bearer provided between the communication device, the radio network controller and the SGSN, and switched packet data channels provided between the SGSN and the GGSN. Each PDP context usually provides a communication pathway between a particular communication device and the GGSN and, once established, can typically carry multiple flows. Each flow normally represents, for example, a particular service and/or a media component of a particular service. The PDP context therefore often represents a logical communication pathway for one or more flow across the network. To implement the PDP context between a communication device and the SGSN, radio access bearers (RAB), i.e. logical and physical channels, need to be established which commonly allow for data transfer for the communication device.

Furthermore, FIG. 1 shows an application server 50 connected to one or more data networks such as, but not limited to, the exemplifying PDN 10. It shall be appreciated that a number of application servers may be connected to each data network. In the FIG. 1 embodiment, the mobile communication devices 22, 32 may connect to the application server 50 via the radio access network 20, 30 and the public data network 10. In an embodiment the application server 50 may locate in an operator intranet and not behind a public data network 10. For example, a PoC server may locate in a private network side.

Furthermore, FIG. 1 shows a broadcast multicast service centre (BM-SC) 60, which provides functions for MBMS service provisioning and delivery. The BM-SC 60 may serve as an entry point for MBMS transmissions of a content provider 62 providing broadcast or multicast data to communication devices situated in a geographical area served by the BM-SC 60. As was explained above, the BM-SC 60 is not able to form groups, but may provide information of different multicasting groups to communication devices in the area. In embodiments of the invention, clients in the communication devices 22, 32 may get available multicast address(es) from application servers 50 via SIP/SDP media negotiation. The clients of the communication devices 22, 32 may try to join the multicast address(es) if available at the area of the communication devices 22, 32. Thus, no user interaction is needed in a way comparable to a normal operation, for example, in relation to a PoC application. In a normal PoC operation, it is a responsibility of users of listening communication devices to subscribe and join to a multicast service in order to receive the data. The BM-SC 60 may be used to authorize and initiate MBMS bearer services within a cellular network and can be used to schedule and deliver MBMS transmissions.

According to embodiments of the present invention, an application server situated beyond a cellular network is able to provide data to a group of communication devices situated in the cellular network. Mechanisms and procedures are described enabling data distribution to large groups also in situations where conventional mechanisms of, for example, data multiplication and point-to-point transfer may be inefficient or even impossible.

The group may be a pre-defined group or an open group, such as the Internet relay chat (IRC) channels. In an embodiment, the application server 50 may invite members to join the group. In an open group embodiment, the application server, such as the PoC server, knows the members at any given moment, but is also possible that either new members are dynamically joined or current members leave the group. In an embodiment, the application server may include the multicast address into a media negotiation answer when other members join the group when responding to a group join request from successive members.

Figure 2:
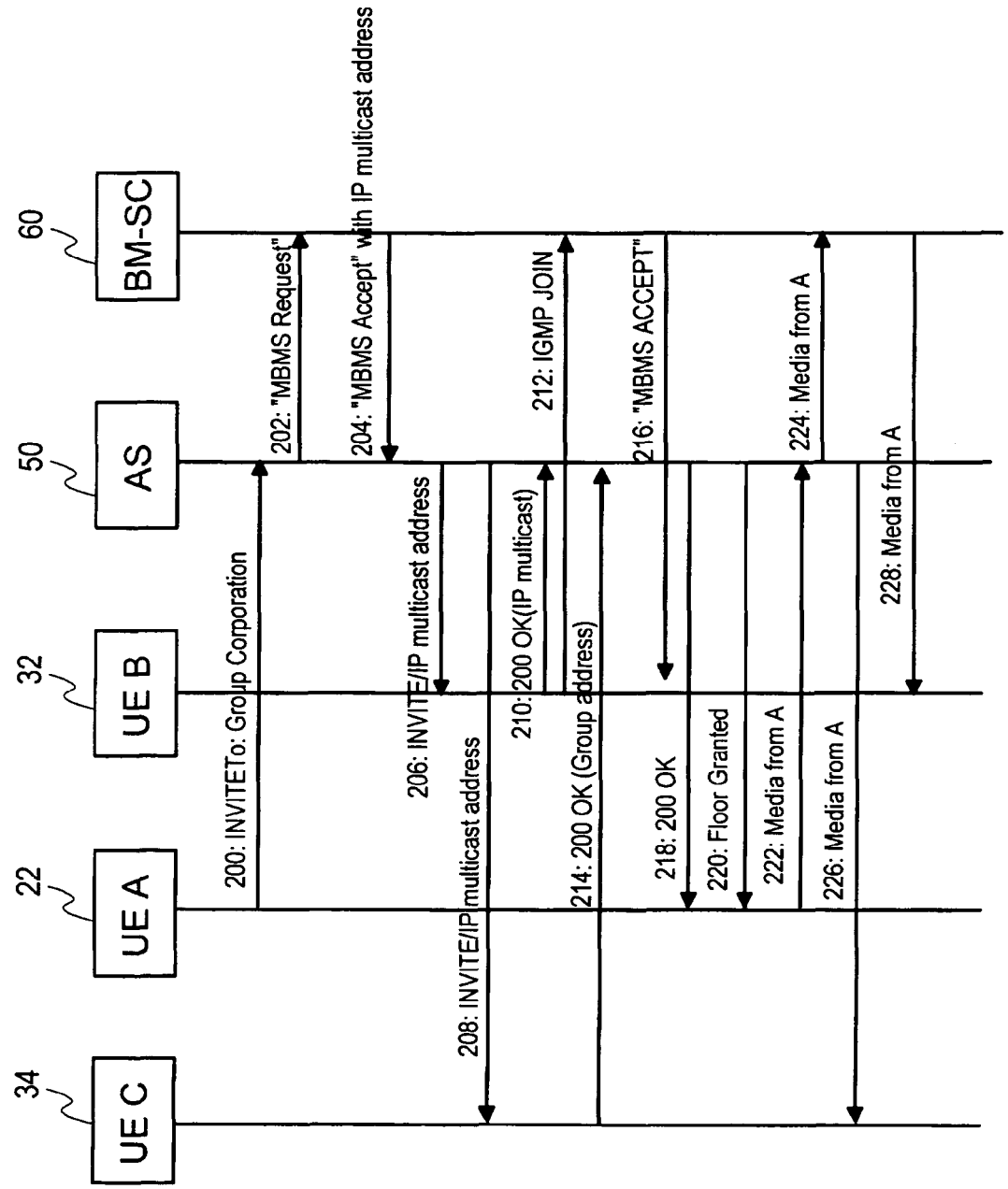
FIG. 2 shows a signaling chart illustrating an embodiment of the invention.

FIG. 2 shows a signalling chart illustrating an exemplifying embodiment. The signals shown in FIG. 2 are named on a functional level for illustrating a function or purpose of each signal. Actual structure of signals may be different or more complex. The structure of the signals may also depend on signalling protocol and other such aspects.

In step 200, an application server (AS) 50 receives an invitation message from a communication device (UE A) 22 to distribute data. The application server 50 identifies a need to distribute data to a group, which appears to be big in size. The application server 50 may determine the size of the group in various ways. In an embodiment, the application server 50 may determine the size of the group by parsing the syntax of a group URI provided by the UE-A. As an example, a group URI may be used for corporate level announcements. In an embodiment, the application server 50 may know how many members are currently connected to the group or how many members will be invited to the group. The application server 50 may have this knowledge based on a pre-configured group member list, for example. In an embodiment, the request to use multicasting may be received from a user. For example, a user client in the communication device of the user can have such an optional feature selection. The application server 50 having identified the need to distribute data to a big group notices that usage of multicast/broadcast may be beneficial and decides to use a multicast/broadcast mechanism according to an embodiment of the invention instead of a conventional procedure.

In step 202, the application server 50 contacts an entity responsible of providing MBMS services. This element may be e.g. a BM-SC 60, which provides functions for service provisioning and delivery. The application server 50 may reserve resources from the BM-SC 60, for example, by a MBMS request message, in order to be able to use the MBMS. The application server 50 may negotiate parameters related to data transfer such as starting times, stopping times, quality of service (QoS) and so on.

In step 204, the application server 50 may get an IP multicast address from the BM-SC 60 in a response accepting the request for MBMS.

In steps 206 and 208, the application server 50 may send invitations to join a group, such as SIP INVITE messages, to all intended members of the group. The invitation messages may include the IP multicast address as the source address (e.g. in the c-line of the SIP Service Description Protocol (SDP)). In addition, the invitation message may comprise a normal multi-unicast group media description. In addition, the application server 50 can include, in the invitation message, other parameters related to the multicast group created, such as QoS, starting/stopping time and so on. These other parameters may be included, for example, as SDP attributes.

In step 210, a first intended member of the group, UE-B 32, having received the invitation message (step 206) from the application server 50 reads from the invitation message that the intended address is an IP multicast address. The intended member UE-B 32 or its application accepts the invitation message as proposed and decides to subscribe to MBMS. The UE-B 32 joins the multicast group whose address was included in the invitation message by replying to application server 50 with a response, such as 200 OK, carrying the IP multicast address indicating that the UE-B 32 has accepted the invitation as proposed. The application server 50 will know that the UE-B 32 will be listening to the multicast group.

In step 212, the UE-B 32 may subscribe to MBMS service and become a member of the multicast group by sending a joining message, such as an IGMP JOIN message, to the BM-SC 60. The BM-SC 60 may accept the request, for example, by an MBMS accept message, shown in step 216. The UE-B 32 is now able to receive the data distributed by the application server 50.

In an embodiment, UE-B 32 may first verify whether the IP multicast address offered by the application server 50 is available in the area where the UE-B 32 is listening. If the UE-B 32 finds that the IP multicast address can be heard, the UE-B 32 may respond the application server 50. The UE-B may send the joining message at the same time when verifying the availability of the IP multicast address or separately before or after having responded to the application server 50. Thus, the order of steps 210 and 212 may change and the steps may be divided in further sub-steps.

In step 214, a second intended member of the group, UE-C 34, having received the invitation message (step 208) from the application server 50 reads from the invitation message that the other offered address is an IP multicast address. The UE-C 34 decides not to subscribe to the group using the MBMS. The UE-C 34 replies to the application server 50 with a response, such as 200 OK, which contains only the unicast media address of the UE-C 34, the proposed multicast address being omitted from the response. The application server 50 will know from the 200 OK sent by the UE-C that the UE-C 34 is not listening to the multicast group. However, the application server 50 may send data to the UE-C 34 in a conventional way, for example by using point-to-point data transfer.

The application server 50 has now knowledge on group members that will listen to multicast group and the application server 50 is able to start delivery of data to MBMS as shown in steps 218-228 of FIG. 2. In steps 218 and 220, the application server 50 informs a media source, such as UE-A 22, of a created multicast/broadcast session. In step 222, the UE-A 22 sends media or data to be distributed to the application server 50. In step 224, the application server sends the media further to the BM-SC 60. In step 226, the application server 50 delivers the media directly to those members who are not listening to the multicast group, namely the UE-C 34 in FIG. 2. For example, the application server 50 may use point-to-point data transfer. In step 228, the BM-SC 60 delivers the data using MBMS to those members who are listening to the multicast group, namely the UE-B 34 in FIG. 2.

In an embodiment, there may be no direct signalling between the application server 50 and the BM-SC 60, instead, the communication device 22 originating the group session may obtain a multicast address from the BM-SC 60 and signal the multicast address to the application server 50 as one of the two media addresses. The application server 50 may then use that address in the offering the application server sends to other group members 32.

In an embodiment, once data is delivered, the multicast sessions can be deactivated by the application server and by individual members using, for example, procedures related to the MBMS functionality. For example, MBMS procedures defined in 3GPP TS 23.246 V.6.3.0 (2004-06) or other appropriate procedures may be used. In an embodiment, the bearer is not released after a data burst, but only when the session (group) is closed.

In the MBMS, as defined in 3GPP TS 23.246 V.6.3.0 (2004-06), signalling between a GGSN and a BM-SC is exchanged at a Gmb reference point including user specific MBMS signalling and MBMS service specific signalling. The Gmb represents a network side boundary of the MBMS bearer service from a control plane perspective.

The MBMS service specific Gmb signalling may comprise following signalling. The GGSN may establish a MBMS bearer context and register at the BM-SC. The GGSN or the BM-SC may release the MBMS bearer context and de-register the GGSN from the BM-SC. The BM-SC may indicate session start and stop to the GGSN including session attributes like QoS or multicast area.

The user specific Gmb signalling may comprise the following signalling. The BM-SC may authorise the user specific MBMS multicast service activation at the GGSN. The GGSN may report to the BM-SC a successful user specific MBMS multicast activation. The GGSN may report to the BM-SC when a user specific MBMS multicast service is released or deactivated (e.g. when the radio contact is lost).

The BM-SC may initiate the deactivation of a user specific MBMS multicast service when the MBMS service is terminated at the application layer.

Reception of an MBMS multicast service may be enabled by procedures described in 3GPP TS 23.246 V.6.3.0 (2004-06) paragraph 4.4.1. These procedures may comprise subscription, service announcement, joining, session start, MBMS notification, data transfer, session stop and leaving. A part of these functions performed in the BM-SC are not used in embodiments of the invention. Instead, in embodiments of the invention, the application server beyond cellular networks may perform similar procedures.

A subscription establishes a relationship between a user and a service provider. The subscription allows the user to receive related MBMS multicast service.

Service announcement and discovery mechanisms, e.g. SMS, cell broadcast and so on, in the MBMS may allow a user to obtain information about available MBMS services. For purposes of the invention, for example when the application server is a PoC server, conventional MBMS service announcement mechanisms may not provide announcement quickly and/or effectively enough. For example, calling or creating a group may be time critical, but in a conventional MBMS service announcement, it is not known to the BM-SC, which communication devices are listening cell broadcasts. Furthermore, using the SMS for sending an announcement in embodiments of the invention may be too slow.

In embodiments of the invention, the application server may provide at least in part service announcement and discovery mechanisms. In an embodiment, the application server knows the multicast address and may embed a service announcement in a message sent from the application server to the communication devices, such as an invitation message, e.g. SIP INVITE.

In an embodiment, the communication devices may discover, by means of the service announcement mechanism of the MBMS, if the multicast address offered by the application server 50 is available in that particular location or area. In an embodiment, a communication device first verifies whether the multicast address offered by the application server can be heard in the area. If the communication device finds that the multicast address can be heard, the communication device may respond the application server, for example by a SIP message, e.g. "200 OK, IP multicast".

By joining, a subscriber or user becomes a member of a multicast group. The user indicates to the network that he/she is willing to receive multicast mode data of a specific service. In an embodiment, after the user has accepted an invitation from the application server, the user joins the multicast group proposed by the application server. Thus, a group of communication devices in a cellular network may receive data from the application server situated beyond the cellular network using the mechanisms of broadcasting and/or multicasting services.

The MBMS multicast service may be activated by an MBMS multicast service activation procedure. The user is registered in a network to enable the reception of data from a specific MBMS multicast service. For service activation, a signalling procedure between the communication device and the network may be carried out, for example, as described in 3GPP TS 23.246 V.6.3.0 (2004-06) paragraph 8.2. The service activation procedure may establish MBMS UE contexts in a communication device, an SGSN and a GGSN as well in an RNC for each activated MBMS multicast service. The MBMS UE contexts may be comparable to regular PDP contexts.

Session start is a point at which an entity responsible of providing MBMS services in a cellular network, such as the BM-SC, is ready to send data. In embodiments of the invention, the data is received from the application server situated beyond said cellular network and having no visibility to locations of receiving devices in said cellular network. The session start may trigger establishment of network resources for MBMS data transfer. The session start also notifies communication devices that data transmission shall start shortly. The session start is not dependent of activation of the respective service by a user, but a user may activate the service before or after the session start.

MBMS notification informs communication devices about forthcoming and possibly about ongoing multicast data transfer. Data transfer is the phase when MBMS data are transferred to the communication devices. Arrival of the first packet at the GGSN may coincide with the session start.

In session stop, typically the BM-SC may determine that there will be no more data to send for a period of time, which is long enough to justify removal of network resources associated with the session. At the session stop, the network resources may be released. In an embodiment, the application server decides on session stop, for example, based on leaving command from the user. The application server may inform the BM-SC correspondingly. In an embodiment, if there is no direct signalling link between the application server and the BM-SC, the client(s) of the communication device(s) may decide whether the multicast address is used anymore.

Leaving means multicast deactivation by the user. The user or subscriber thus leaves a multicast group and no longer receives multicast mode data of the service in question. In embodiments of the invention, the user or subscriber may inform the application server that the user no longer wants to receive data by means of a multicast service. Furthermore, the user may inform the application server that unicast data should be sent instead of the multicast data.

Although the invention has been described in the context of particular embodiments, various modifications are possible without departing from the scope and spirit of the invention as defined by the appended claims. It may also be possible to implement a similar concept, for example, on a (wireless) local area network (LAN or WLAN) environment.

The invention claimed is:

1. A method, comprising:
defining, by an application server situated beyond a cellular network, a group of communication devices in the cellular network to receive data from the application server via a broadcast/multicast service, the application server having no visibility to locations of receiving devices in the cellular network;
sending a request message, by the application server to a broadcast/multicast network entity, to reserve resources for broadcast/multicast data transmission to the group of communication devices, the broadcast/multicast network entity configured to provide broadcast and multicast services in the cellular network; and
sending the data, by the application server to the broadcast/multicast network entity, for broadcast/multicast transmission to the group of communication devices.

2. The method according to claim 1, wherein the sending the request message comprises signaling between the application server and the broadcast/multicast network entity for a multimedia broadcast/multicast service establishment.

3. The method according to claim 1, further comprising:
receiving, by the application server, multicast address information from the broadcast/multicast network entity.

4. The method according to claim 1, further comprises:
receiving multicast address information from a cellular client of a communication device.

5. The method according to claim 1, further comprising:
sending an invitation to one or more communication devices in the cellular network to join the group, the invitation comprising multicast address information.

6. The method according to claim 5, wherein the group comprises selected communication devices which have accepted to become a member of the group.

7. The method according to claim 5, further comprising:
transmitting the data using a point-to-point transfer to communication devices that have not accepted to join the group.

8. The method according to claim 1, further comprising:
responding, by the application server, to a group join request from one or more members of the group, with a media negotiation answer, the media negotiation answer comprising multicast address information.

9. The method according to claim 1, wherein the sending comprises sending the data via a Gi interface.

10. The method according to claim 1, wherein the application server comprises an internet protocol application server.

11. The method according to claim 10, wherein the application server comprises a push to talk over cellular server.

12. An apparatus, comprising:
a receiver configured to receive a request message from an application server for reserving resources for broadcast/multicast services, wherein the application server is situated beyond a cellular network and having no visibility to locations of receiving devices in the cellular network;
a processor configured to reserve broadcast/multicast resources corresponding to the request message; and
a transmitter configured to transmit a response to the request message to the application server,
wherein the receiver is further configured to receive data from the application server, and the transmitter is further configured to transmit the data to a group of communication devices in the cellular network using at least one of broadcast and multicast transmission via support nodes of the cellular network, wherein the group is defined by the application server.

13. The apparatus according to claim 12, wherein the receiver is further configured to receive the data to be transmitted from a push to talk over cellular server.

14. The apparatus according to claim 13, wherein the support nodes of the cellular system comprise a gateway general packet radio services support node and a serving general packet radio services support node.

15. An apparatus, comprising:
a transceiver configured to communicate with a broadcast/multicast network entity to reserve broadcast/multicast services; and
a processor configured to define a group of communication devices in the cellular network to receive data from the apparatus via a broadcast/multicast service, the apparatus having no visibility to locations of the communication devices in the cellular network,
wherein the transceiver is further configured to receive data from a communication device and transmit the data to the broadcast/multicast network entity for broadcast/multicast transmission to the group of communication devices via cellular network support nodes.

16. The apparatus according to claim 15, wherein the transceiver is further configured to receive multicast address information from the broadcast/multicast network entity.

17. The apparatus according to claim 15, wherein the transceiver is further configured to receive multicast address information from a cellular client of a communication device.

18. The apparatus according to claim 15, the processor is further configured to send an invitation to one or more communication devices in the cellular network to join the group, the invitation comprising multicast address information.

19. The apparatus according to claim 15, wherein the processor is further configured to respond to a group join request from one or more communication devices with a media negotiation answer, and to include multicast address information in said media negotiation answer.

20. The apparatus according to claim 15, wherein the support nodes of the cellular system comprise a gateway general packet radio services support node and a serving general packet radio services support node.

21. An apparatus, comprising:
communicating means for communicating with a broadcast/multicast network entity to reserve broadcast/multicast services; and
defining means for defining a group of receiving communication devices in the cellular network, having no visibility to locations of the receiving communication devices in the cellular network,
wherein the communicating means is also for receiving means for receiving data from a communication device and transmitting the data to the broadcast/multicast network entity for broadcasting or multicasting the data to the group via the broadcast/multicast services and cellular network support nodes.

22. A method, comprising:
receiving a request message from an application server for reserving broadcast/multicast resources in the apparatus, wherein the application server is situated beyond a cellular network and having no visibility to locations of receiving devices in the cellular network;
reserving broadcast/multicast resources corresponding to the request message;
transmitting a response to the request message to the application server, receiving data from the application server; and
transmitting the data to a group of communication devices in the cellular network using at least one of broadcast and multicast transmission via support nodes of the cellular network, wherein the group is defined by the application server.

23. The method according to claim 22, wherein the support nodes of the cellular system comprise a gateway general packet radio services support node and a serving general packet radio services support node.

24. An apparatus, comprising:
receiving means for receiving a request message from an application server for reserving broadcast/multicast resources in the apparatus, wherein the application server is situated beyond a cellular network and having no visibility to locations of receiving devices in the cellular network;
reserving means for reserving broadcast/multicast resources corresponding to the request message; and
transmitting means for transmitting a resources reserved message to the application server, wherein the receiving means is also for receiving data from the application server, and the transmitting means is also for transmitting the data to a group of communication devices in the cellular network using at least one of broadcast and multicast transmission via support nodes of the cellular network, wherein the group is defined by the application server.

* * * * *